US009864356B2

(12) United States Patent
Lu et al.

(10) Patent No.: US 9,864,356 B2
(45) Date of Patent: Jan. 9, 2018

(54) NONLINEAR PARAMETER VARYING (NPV) MODEL IDENTIFICATION METHOD

(75) Inventors: Jiangang Lu, Zhejiang (CN); Jie You, Zhejiang (CN); Qinmin Yang, Zhejiang (CN); Youxian Sun, Zhejiang (CN)

(73) Assignee: Zhejiang University, Zhejiang (CN)

( * ) Notice: Subject to any disclaimer, the term of this patent is extended or adjusted under 35 U.S.C. 154(b) by 382 days.

(21) Appl. No.: 14/398,904

(22) PCT Filed: Jun. 21, 2012

(86) PCT No.: PCT/CN2012/077295
§ 371 (c)(1),
(2), (4) Date: Nov. 19, 2014

(87) PCT Pub. No.: WO2013/163840
PCT Pub. Date: Nov. 7, 2013

(65) Prior Publication Data
US 2015/0120630 A1 Apr. 30, 2015

(30) Foreign Application Priority Data
May 4, 2012 (CN) .......................... 2012 1 0138606

(51) Int. Cl.
G06F 15/18 (2006.01)
G06N 3/08 (2006.01)
G05B 17/02 (2006.01)

(52) U.S. Cl.
CPC ............... G05B 17/02 (2013.01); G06N 3/08 (2013.01)

(58) Field of Classification Search
USPC .......................................................... 706/25
See application file for complete search history.

(56) References Cited

U.S. PATENT DOCUMENTS 7,817,123 B2 * 10/2010 Do ........................ G09G 3/3655
345/204
7,978,293 B2 * 7/2011 Yang .................... C09K 19/348
349/129

(Continued)

FOREIGN PATENT DOCUMENTS

CN         1598720 A      3/2005
CN       101349893 A      1/2009

(Continued)

OTHER PUBLICATIONS

A multi-level fuzzy control design for general nonlinear multi-input single-output systems C. Xu; Y. C. Shin NAFIPS 2008—2008 Annual Meeting of the North American Fuzzy Information Processing Society Year: 2008 pp. 1-6 IEEE Conference Publications.*

(Continued)

Primary Examiner — Michael B Holmes
(74) Attorney, Agent, or Firm — Muncy, Geissler, Olds & Lowe, P.C.

(57) ABSTRACT

The invention discloses an identification method of nonlinear parameter varying models (NPV) and belongs to the industrial identification field. The invention carries out identification tests and model identification for an identified object with nonlinear parameter varying characteristics. Firstly, the multi-input single-output nonlinear parameter varying model is identified through the steps of local nonlinear model tests, local nonlinear models identification, and operating point variable transition tests; after completing the identification of all the multi-input single-output nonlinear parameter varying models with respect to all the controlled variables, the completed multi-input multi-output nonlinear parameter varying models are built. The nonlinear parameter varying models of an identified object can be obtained by the identification method of the present invention with limited input/output data without detailed mechanism knowledge of (Continued)

the identified object. The nonlinear parameter varying models obtained can be used in model-based control algorithm design and process simulation, as well as in product quality prediction reasoning models and soft sensors.

9 Claims, 13 Drawing Sheets

(56) References Cited

U.S. PATENT DOCUMENTS

| | | | | |
|---|---|---|---|---|
| 8,553,332 | B2* | 10/2013 | Yun | G02B 27/2214 359/619 |
| 8,593,583 | B2* | 11/2013 | Lee | G02F 1/134363 349/136 |
| 8,629,820 | B2* | 1/2014 | Do | G09G 3/3655 345/204 |
| 9,229,262 | B2* | 1/2016 | Yun | G02B 27/2214 |
| 2005/0187643 | A1 | 8/2005 | Sayyar-Rodsari et al. | |
| 2006/0111858 | A1 | 5/2006 | Zhu | |

FOREIGN PATENT DOCUMENTS

| | | |
|---|---|---|
| CN | 101587328 A | 11/2009 |
| EP | 1710654 | 10/2006 |

OTHER PUBLICATIONS

Multivariable model predictive control of wind turbines in presence of actuator fault Mohamed A Benlahrache; Sami Othman; Nida Sheibat-Othman 2017 8th International Renewable Energy Congress (IREC) Year: 2017 pp. 1-6 IEEE Conference Publications.*
Acceleration planning based anti-swing and position control for double-pendulum cranes Cangcang Liu; Bo Sun; Fan Li 2017 29th Chinese Control and Decision Conference (CCDC) Year: 2017 pp. 5671-5675 IEEE Conference Publications.*
Quasi-LPV modelling and control of TRMS Anagha Sudhakar; Jeevamma Jacob 2016 IEEE 1st International Conference on Power Electronics, Intelligent Control and Energy Systems (ICPEICES) Year: 2016 pp. 1-6 IEEE Conference Publications.*
R. Jaisinghani et al., "On the Dynamic Behaviour of a Class of Homogeneous Continuous Stirred Tank Polymerization Reactors," Chemical Engineering Science, vol. 32, 1977, pp. 811-825.
Y. Zhao et al., "Prediction error method for identification of LPV models," Journal of Process Control, 22, 2012, pp. 180-193.

* cited by examiner

NONLINEAR PARAMETER VARYING (NPV) MODEL IDENTIFICATION METHOD

FIELD OF THE INVENTION

The present invention relates to the field of industrial system identification and is used to identify the industrial processes such as oil refining, petrochemical, power, chemical, pharmaceutical, metallurgy, food and paper, where the identified objects are usually nonlinear parameter varying. The nonlinear parameter varying models (NPV) obtained by the present invention can be used for model-based control algorithm design and process simulation, and can also be used for product quality prediction reasoning models and soft sensors.

BACKGROUND OF THE INVENTION

At present, in order to meet the needs of the complex nonlinear system control, many model-based control algorithms have been proposed (such as model predictive control, robust control, nonlinear control, optimal control, etc.), but there exists one very important factor to restrict the wider applications of these control algorithms, which is the need for accurate and reliable nonlinear models with limited identification data. In the field of nonlinear identification, identification of nonlinear or linear parameter varying models has been the research hotspot.

In the field of nonlinear identification, there are three main types of identification methods: the first type is the piecewise linear methods for weak nonlinear system identification; the second type is the non-parametric model identification methods, mainly including neural networks identification method and fuzzy identification method; the third type is the system identification methods based on Hammerstein or Wiener model structure, which comprise the static nonlinear part and the dynamic linear part, and they have been widely used in the field of nonlinear identification. The above nonlinear identification methods are identification methods based on constant parameters (i.e. constant operating point variable values). However, in the real industries, the model identification based on varying parameters will bring great improvements for the controller design optimization.

In recent years, the identification research of linear parameter varying models has achieved great progress. The identification concept of linear parameter varying models (Linear Parameter Varying, or LPV for short) was first proposed by the Shamma and Athans, where the system is described by linear models with varying parameters. The main directions of this field can be divided into two categories: one is based on the parameter interpolation LPV models, and the other is based on model interpolation LPV models. As pointed out in the literature of Yu Zhao et al. (2011), Prediction error method for identification of LPV models, Journal of Process Control, 22(1):180-193, the model interpolation LPV model identification method is better than the parameter interpolation LPV model identification method in both computation time and accuracy. Although the linear parameter varying models can be a good solution to describe the effect of parameter nonlinear varying on the system, they uses simple linear models to describe the system models at a given operating point, ignoring the nonlinear relationship between the system input and the system output at a given operating point. However, in the real industrial process, there exists not only the nonlinearity of parameter varying, but also the nonlinearity between the system input and the system output at a given operating point.

Thus, it is of great significance for model-based control to propose a model identification method taking into account both the nonlinearity between the system input and the system output at a given operating point and the nonlinearity of parameter varying with operating point variable values, meanwhile the method needs limited data for identification and achieves higher accuracy.

SUMMARY OF THE INVENTION

In order to solve the technical problems, we propose an identification method of nonlinear parameter varying models (Nonlinear Parameter Varying, or NPV for short), with the following technical solutions:

To propose an identification method of nonlinear parameter varying models (NPV), the method based on nonlinear model identification system, said system comprises four parts including input module, identified object, output module, and system identification module, the input module applies the excitation signal to the identified object, the output signal of the identified object is sent to the system identification module by using the output module, the operating conditions of the identified object are described with one or more operating point variables, said method comprises the following steps:

Step (1), local nonlinear model tests: the term "local" refers to that the value of the operating point variable remains constant; firstly, set the value of the operating point variable; on the premise of that the operating point variable remains constant, set the values of the manipulating variables in their working intervals; then, traverse all the values of the manipulating variables (MV) in their working intervals by using the input module, and obtain the steady-state output data with respect to one controlled variable (CV) from the output module; if the number of the manipulating variables (MV) is more than one, when traversing all the values of one manipulating variable in its working interval by using the input module, other manipulating variables remain constant; finally, the excitation signal is applied to all the manipulating variables (MV) of the identified object by using the input module, and obtain the dynamic output data with respect to said controlled variable (CV) from the output module; that the value of the operating point variable remaining constant means that the value of the operating point variable may be precisely equal to a constant value; or may be refer to the value of the operating point variable making small-scope fluctuations around a constant value, said small-scope fluctuations may be due to the effects resulted from operating condition slight fluctuations, instrumentation noise, actuator jitter and other objective factors prevalent in industrial process fields; or may also be due to the effects resulted from the superposed signal as the excitation signal applied to the manipulating variables of the identified object for identification test by using the input module, said superposed signal comprises the generalized binary noise test signal (GBN) and the small-amplitude white noise; for example, if reaction temperature of a reactor was chosen to be the operating point variable, the reaction temperature may be making small-scope fluctuations between 319.8K-320.2K, and the average value of the reaction temperature is very close to 320K, the present invention confirms that the value of the operating point variable remaining constant at the value of 320K; operating point variable of the present invention may be manipulating variable (MV), controlled variable (CV), or other intermediate variable which can describe the operating condition of the identified object.

Step (2), identify local nonlinear models: the system identification module automatically carries out the local nonlinear model identification based on the steady output data and dynamic output data obtained in step (1) by using the nonlinear identification method to estimate the parameters of the local nonlinear models, and then obtains the local nonlinear models at the set value of the operating point variable in step (1).

Step (3), repeat the above step (1) and step (2) for automatically completing the identification of all required local nonlinear models with respect to all set operating point variable values, and obtain all required local nonlinear models of all set operating point variable values; said all set operating point variable values include the upper bound and the lower bound of the operating range of the operating point variable; and then check whether the local nonlinear models can meet the required accuracy threshold; if it is not satisfied, adjust the values of the manipulating variables in their working intervals and/or adjust the excitation signal, then return to step (1); otherwise, continue;

Step (4), operating point variable transition tests: said operating point variable transition tests are to transit the identified object from one operating point variable value to another operating point variable value by using the input module; in the operating point variable transition tests, change the operating point variable value, and apply the excitation signal to all the manipulating variables (MV) of the identified object by using the input module, and then obtain the operating point variable transition dynamic output data with respect to said controlled variable (CV) from the output module;

Step (5), identify the multi-input single-output nonlinear parameter varying model: all required local nonlinear models are utilized to convert the local nonlinear models to the multi-input single-output nonlinear parameter varying model (NPV) by using the interpolation philosophy, the weighting functions used in the interpolation philosophy are determined by the parameter estimation method based on the total testing data which include the local nonlinear model test data and the operating point variable transition test data;

Step (6), check whether the multi-input single-output nonlinear parameter varying model (NPV) obtained in Step (5) can meet the required accuracy threshold; if it is not satisfied, increase the number of the local nonlinear models and turn to step (3), or increase the operating point variable transition test data and turn to step (4); if satisfied, continue;

Step (7), repeat the above steps from step (1) to step (6) for identifying all the multi-input single-output nonlinear parameter varying models (NPV) with respect to all the controlled variables (CV), and then complete the identification of the multi-input multi-output nonlinear parameter varying models (NPV) by putting together all the multi-input single-output nonlinear parameter varying models (NPV) with respect to all the controlled variables (CV).

The nonlinear identification method in said step (2) is the identification method based on non-parametric model, or the system identification method based on Hammerstein or Wiener structural model.

The system identification method based on Hammerstein or Wiener structural model in said step (2) is the system identification method based on Hammerstein or Wiener structural parametric model, or is the system identification method based on Hammerstein or Wiener structural non-parametric/parametric hybrid model, the Hammerstein or Wiener structural model is preferably consisting of the normalized static nonlinear part of the model and the linear part of the model.

The system identification method based on Hammerstein structural non-parametric/parametric hybrid model in said step (2) adopts the nonlinear hybrid Hammerstein model structure, said structure is preferably consisting of the static normalized direct linear feedback neural networks (Direct Linear Feedback, or DLF for short) part and the linear part of the model.

The system identification method based on nonlinear hybrid Hammerstein model structure in said step (2) comprises the following steps:

1) train the static normalized direct linear feedback neural networks (DLF): (a) normalize the steady-state output data with respect to said controlled variable (CV) at the set value of the operating point variable; (b) fit the linear algebraic equations $X(t)=WU(t)$ by using the normalized steady-state output data and the steady-state input data, where $U(t)$ is the steady-state input data, W is constant coefficient matrix, $X(t)$ is intermediate variable; (c) calculate the error $E(t)$ between the normalized steady-state output data of the identified object and $WU(t)$; (d) train the multilayer feedforward BP neural networks mapping by using the error $E(t)$ and the steady-state input data $U(t)$;

2) identify the linear part of the model: (a) convert all dynamic input data $\{U(t)\}$ to intermediate variable data $\{X(t)\}$ by using the static DLF neural networks obtained; (b) the parameters used in the linear part of the model are determined by the linear identification method, using intermediate variable data $\{X(t)\}$ and dynamic output data $\{Y(t)\}$ as input data and output data for the linear part of the model, respectively.

Said step (5) comprises the following steps:

1) firstly, the normalized direct linear feedback neural networks (DLF) of local nonlinear models with respect to all required operating point variable values are weighted by triangular weighting functions; said triangular weighting functions are predetermined instead of parameter identification;

2) then, based on the obtained local nonlinear models of all required operating point variable values, curve mapping between input data and output data of all local nonlinear model tests and all operating point variable transition tests is carried out by using weighting functions, wherein the weighting function parameters are estimated by using the least square method.

The weighting functions used in the interpolation philosophy in said step (5) are nonlinear functions of operating point variable, said weighting functions adopt spline functions, exponential functions or polynomial functions; the parameter estimation method of said weighting functions adopt the least square method or the maximum likelihood estimation method.

The present invention has the advantages that:

(1) The present invention proposes an identification method of nonlinear parameter varying models, just running along the operating trajectory to carry out the identification tests and model identification, dramatically reducing the cost of model identification tests, model identification calculation process keeping simple and reliability, and taking into account both the nonlinearity between the system input and the system output at a given operating point and the nonlinearity of parameter varying with operating point variable values; black-box identification of a nonlinear parameter varying object can be carried out with limited input and output data without detailed mechanism knowledge of the identified object.

(2) According to the invention, local nonlinear models can be identified based on non-parametric models (e.g., identification methods based on neural networks, identification methods based on fuzzy functions, etc.), and can also be identified based on Hammerstein or Wiener structural parametric models or hybrid structure, which can adopt the present achievements in nonlinear and linear parameter varying research field.

(3) System identification based on non-parametric Hammerstein or Wiener structural non-parametric and parametric hybrid model can adopt the typical structure of the nonlinear hybrid Hammerstein model, which is preferably consisting of the steady-state normalized direct linear feedback neural networks part of the model and the linear part of the model; the model structure has a high nonlinear fitting accuracy and can approximate most industrial nonlinear characteristics to make controller design easily.

(4) The static normalized direct linear feedback neural networks (DLF) of local nonlinear models obtained are weighted by triangular weighting functions, and the triangular weighting functions are pre-set without parameter identification. It is easy to operate and takes the compensation for nonlinear variation trends into account, which can meet the accuracy requirements for most industrial objects.

(5) The parameter estimation method of the weighting functions in the present invention adopt the least square method or the maximum likelihood estimation method, which make it easy and reliable to carry out the computing process of model identification, and has fast learning ability to promote generalization.

(6) All required local nonlinear models are utilized to convert the local nonlinear models to nonlinear parameter varying model (NPV) by using the interpolation philosophy, and the identification tests and model identifications are carried out along the operating trajectory comprising of all set operating point variable values and operating point variable transitions, which dramatically reduce the cost of model tests.

(7) Identification method of nonlinear parameter varying models (NPV) can realize model simplification for the complicated mechanism models, and can also be used in model-based control algorithm design and process simulation, as well as in product quality prediction reasoning models and soft sensors.

DETAILED DESCRIPTION OF THE INVENTION

The present invention can simultaneously handle both the nonlinearity between the system input and the system output at a given operating point and the nonlinearity of parameter varying with operating point variable values when identifying industrial process objects. Typical examples of parameter varying processes in actual industrial plants includes: different-viscosity lubricating oil units, multi-grade polymer units, different-load coal-fired units. The variations of these processes are quite different when operating at different operating point values or in different operating range, and they are generally nonlinear. Operating point variable can be manipulating variable (MV), controlled variable (CV), or other intermediate variable which can describe the operating condition of the identified object; for example, the coal-fired generator load (intermediate variable), the raw material supply (manipulating variable), the viscosity of lubricating oil unit (controlled variable).

Figure 1:
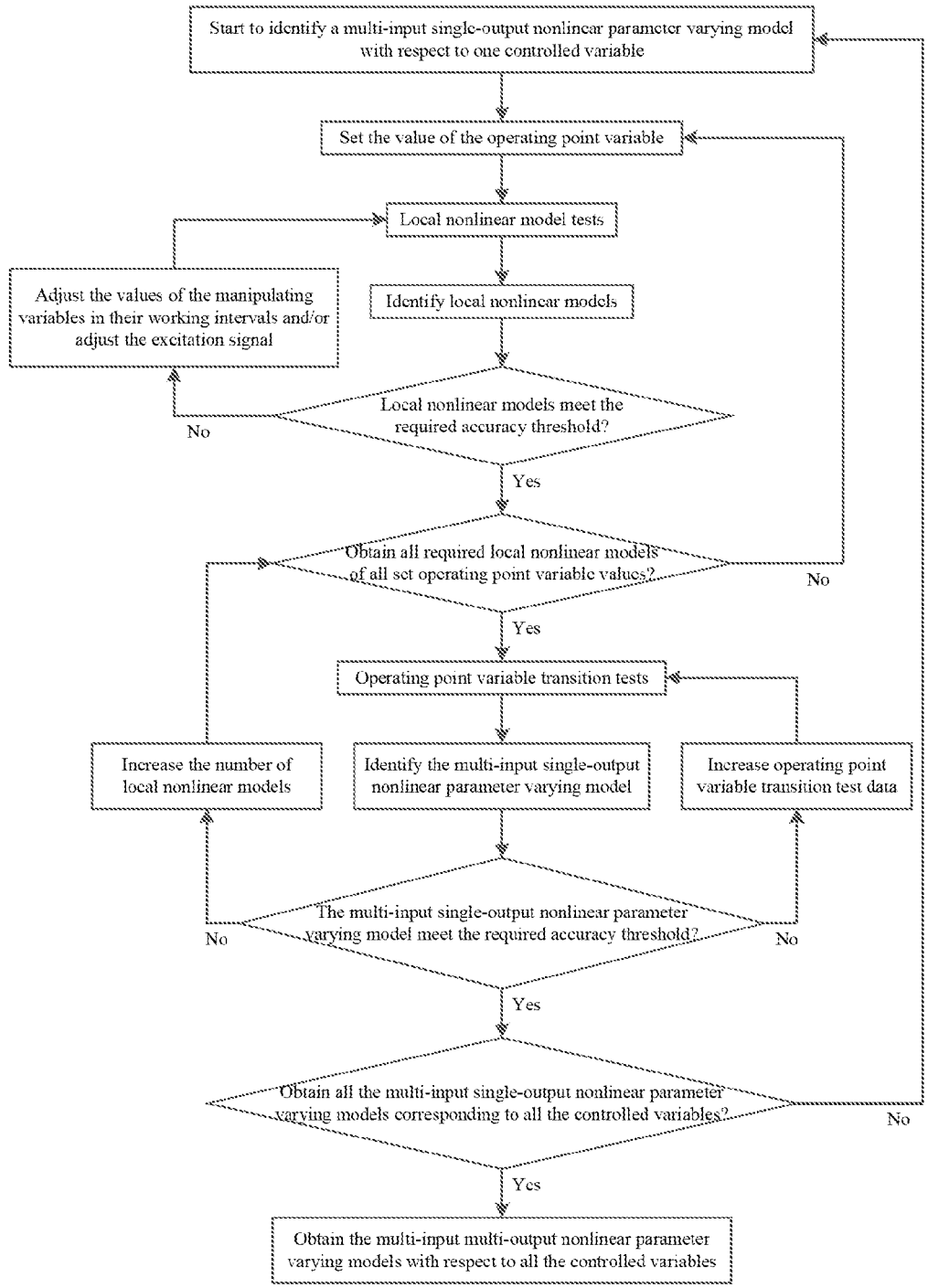
FIG. 1 shows the flow diagram of the identification method of multi-input multi-output nonlinear parameter varying models (NPV).
Figure 2:
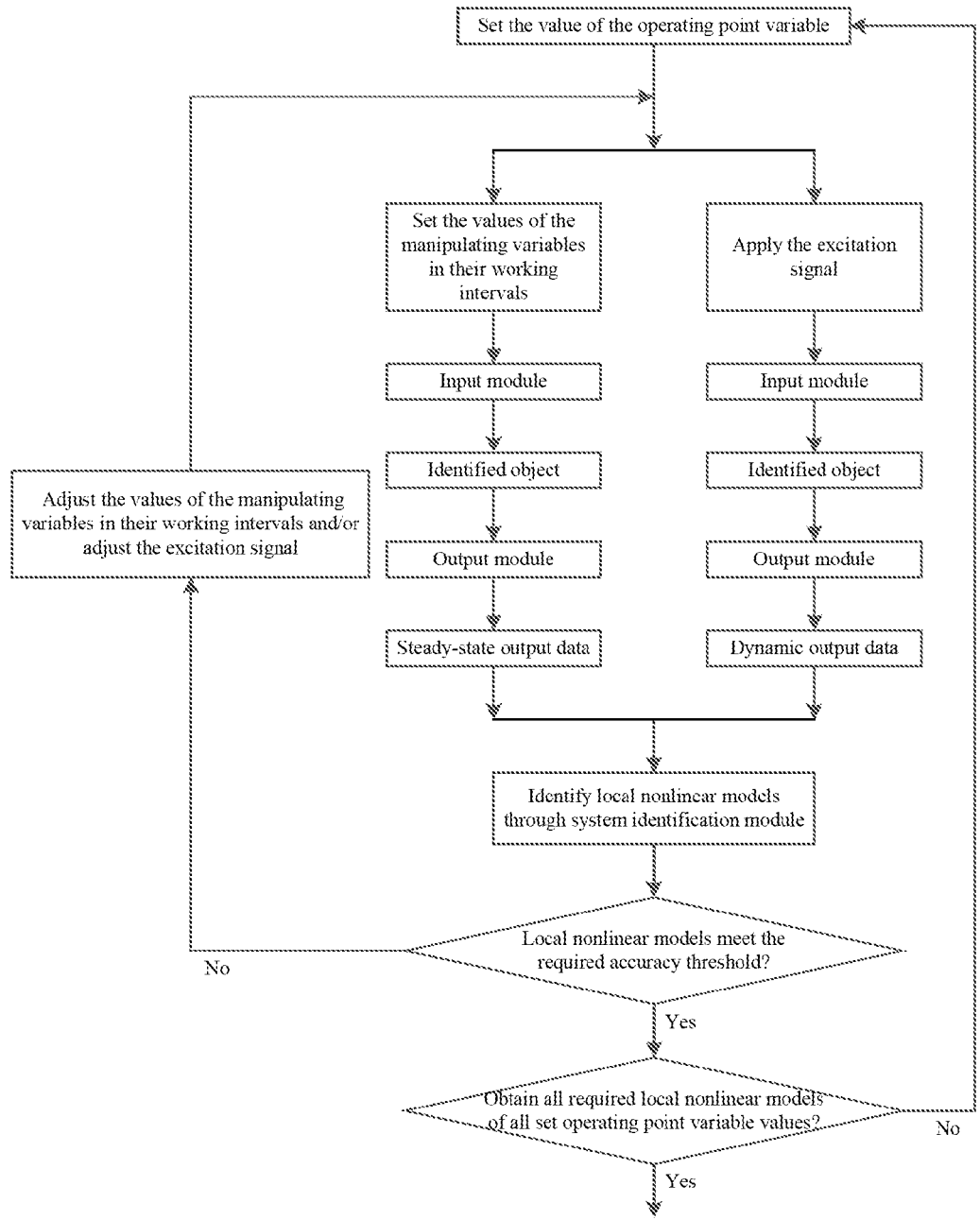
FIG. 2 shows the flow diagram of local nonlinear model tests.
Figure 4:
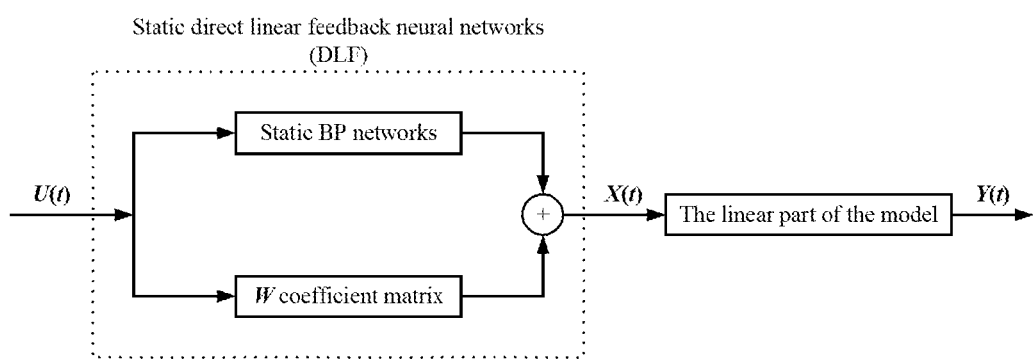
FIG. 4 shows the model structure of direct linear feedback neural networks (DLF).
Figure 5:
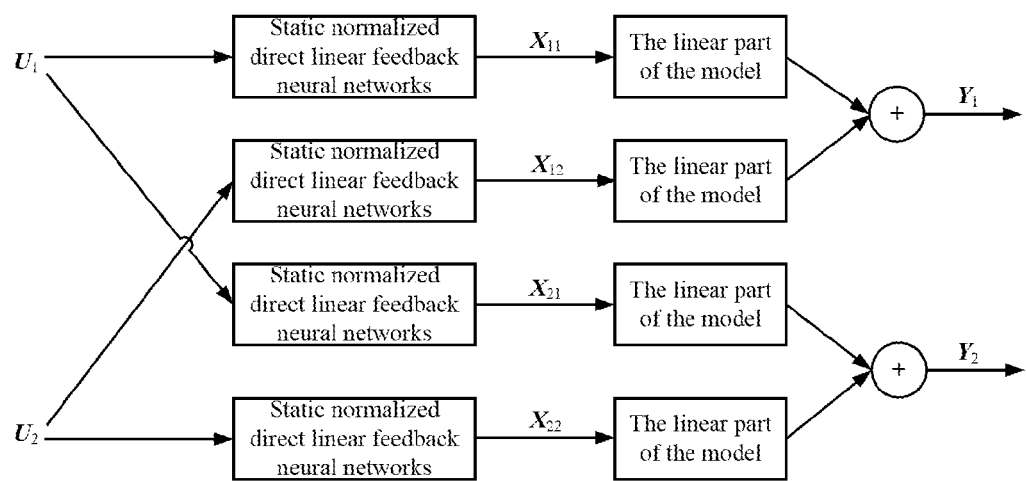
FIG. 5 shows the model structure of two-input two-output nonlinear hybrid Hammerstein model.

The term "nonlinear parameter varying" (NPV) means that the parameters of the nonlinear model are varying with the different operating point values. For a constant operating point, NPV models have corresponding local nonlinear models; if setting three operating point variable values, there are three local nonlinear models. In each local nonlinear model, the steady-state nonlinear gain (or magnification) and time constants are functions of operating point variable and varying with the latter. Said method comprises the following steps to carry out the identification method of nonlinear parameter varying models:

An identification method of nonlinear parameter varying models (NPV), the method based on nonlinear model identification system, said system comprises four parts including input module, identified object, output module, and system identification module, the input module applies the excitation signal to the identified object, the output signal of the identified object is sent to the system identification module by using the output module, said excitation signal adopts superposed signal comprising the generalized binary noise test signal (GBN) and the small-amplitude white noise, the operating conditions of the identified object are described with one or more operating point variables. FIG. 1 shows the flow diagram of the identification method of nonlinear parameter varying models (NPV), comprising the following steps:

Step (1), local nonlinear model tests: FIG. 2 shows the flow diagram of local nonlinear model tests. Firstly, set the value of the operating point variable; on the premise of that the operating point variable remains constant, set the values of the manipulating variables in their working intervals; then, traverse all the values of the manipulating variables (MV) in their working intervals by using the input module, and obtain the steady-state output data with respect to one controlled variable (CV) from the output module; if the number of the manipulating variables (MV) is more than one, when traversing all the values of one manipulating variable in its working interval by using the input module, other manipulating variables remain constant; finally, the excitation signal is applied to all the manipulating variables (MV) of the identified object by using the input module, and obtain the dynamic output data with respect to said controlled variable (CV) from the output module;

Step (2), identify local nonlinear models: the system identification module automatically carries out the local nonlinear model identification based on the steady output data and dynamic output data obtained in step (1) by using the nonlinear identification method to estimate the parameters of the local nonlinear models, and then obtains the local nonlinear models at the set value of the operating point variable in step (1); said local nonlinear models can be the identification method based on non-parametric model (e.g., the identification method based on neural networks, the identification method based on fuzzy functions), can also be the system identification method based on Hammerstein or Wiener parametric model or non-parametric/parametric hybrid model, which can adopt the present achievements in nonlinear and linear parameter varying research field. When using the identification method based on non-parametric model, all required local nonlinear models of all set operating point variable values can directly adopt the least square method to carry out the interpolation philosophy, without the need of weighted operation for the normalized static nonlinear part of the model by triangle weighting functions. The system identification method based on Hammerstein non-parametric/parametric hybrid model can adopt nonlinear hybrid Hammerstein model structure, said structure is preferably consisting of the static normalized direct linear feedback neural networks (DLF) part and the linear part of the model. Normalize the static nonlinear part of any other non-parametric/parametric hybrid models based on Hammerstein or Wiener model structure, and then nonlinear parameter varying models (NPV) can be obtained by the same procedure as the identification method based on nonlinear hybrid Hammerstein model structure. Therefore, this embodiment employs nonlinear hybrid Hammerstein model structure as an example to illustrate the specific steps, nonlinear hybrid Hammerstein model structure are shown in FIG. 4 and FIG. 5. Assuming multi-input single-output system is an m-input single-output system, nonlinear hybrid Hammerstein model structure expression is as follows:

$$Y(t) = G_1(q, \delta(t)) \times f_1[\delta(t), u_1(t)] + \quad (1)$$
$$\ldots + G_m(q, \delta(t)) \times f_m[\delta(t), u_m(t)] + v(t)$$

where $$G_i(q, \delta(t)) = \quad (2)$$
$$\frac{B_i(q, \delta)}{A_i(q, \delta)} = \frac{[b_1^i(\delta)q^{-1} + \ldots + b_n^i(\delta)q^{-n}]q^{-d_i}}{1 + a_1^i(\delta)q^{-1} + \ldots + a_n^i(\delta)q^{-n}} (i = 1, \ldots m)$$

$G_i(q, \delta(t))$ is the transfer function from the intermediate variable $X(t)$ to the controlled variable $Y(t)$, $q^{-1}$ is the delay operator, n is the model order, d is the pure delay, $z(t)$ is a zero-mean random noise. $f_i[\delta(t), u_i(t)]$ is a normalized static nonlinear function of the operating point variable $\delta(t)$, which can express the varying trend of the nonlinear steady-state gains. Normalized nonlinear function $f(.)$ is represented by a direct linear feedback (DLF) neural network, specific structure can refer to FIG. 4. Nonlinear hybrid Hammerstein model can be obtained as follows:

1) train the static normalized direct linear feedback neural networks (DLF) to describe the static non-linear characteristics of the identified object. Obtain the steady-state output data and the steady-state input data (can be obtained by tests) for multi-input single-output processes at a given operating point variable value, then normalize the steady-state output data, fit the linear algebraic equations $X(t)=WU(t)$ by using the normalized output data and the input data, which will play the role of rough fitting, where $U(t)$ is the steady-state input data, W is constant coefficient matrix, $X(t)$ is intermediate variable; calculate the error $E(t)$ between the normalized steady-state output data of the identified object and $WU(t)$, and then train the multilayer feedforward BP neural networks mapping by using the error $E(t)$ and the steady-state input data $U(t)$;

2) identify the linear part of the model: obtain all dynamic input/output data $\{U(t)\}$, $\{Y(t)\}$, convert all input data $\{U(t)\}$ to intermediate variable $\{X(t)\}$ by using the static DLF neural networks obtained, and then determine the parameters used in the linear part of the model by linear identification method (e.g., asymptotic identification method, prediction error method), using intermediate variable $\{X(t)\}$ and dynamic output data $\{Y(t)\}$ as input data and output data for the linear part of the model, respectively.

Step (3), repeat the above step (1) and step (2) for automatically completing the identification of all required local nonlinear models of all set operating point variable values, and obtain all required local nonlinear models of all set operating point variable values; said all set operating point variable values include the upper bound and the lower bound of the operating range of the operating point variable;

Three multi-input single-output local nonlinear models, obtained by the above identification method based on nonlinear hybrid Hammerstein model, can be written as $$Y(t)=\hat{G}_1^1(q)\times\hat{f}_1^1[u_1(t)]+ \ldots +\hat{G}_m^1(q)\times\hat{f}_m^1[u_m(t)],$$
when $\delta(t)=\delta_1$ (3a)

$$Y(t)=\hat{G}_1^2(q)\times\hat{f}_1^2[u_1(t)]+ \ldots +\hat{G}_m^2(q)\times\hat{f}_m^2[u_m(t)],$$
when $\delta(t)=\delta_2$ (3b)

$$Y(t)=\hat{G}_1^3(q)\times\hat{f}_1^3[u_1(t)]+ \ldots +\hat{G}_m^3(q)\times\hat{f}_m^3[u_m(t)],$$
when $\delta(t)=\delta_3$ (3c)

Figure 3:
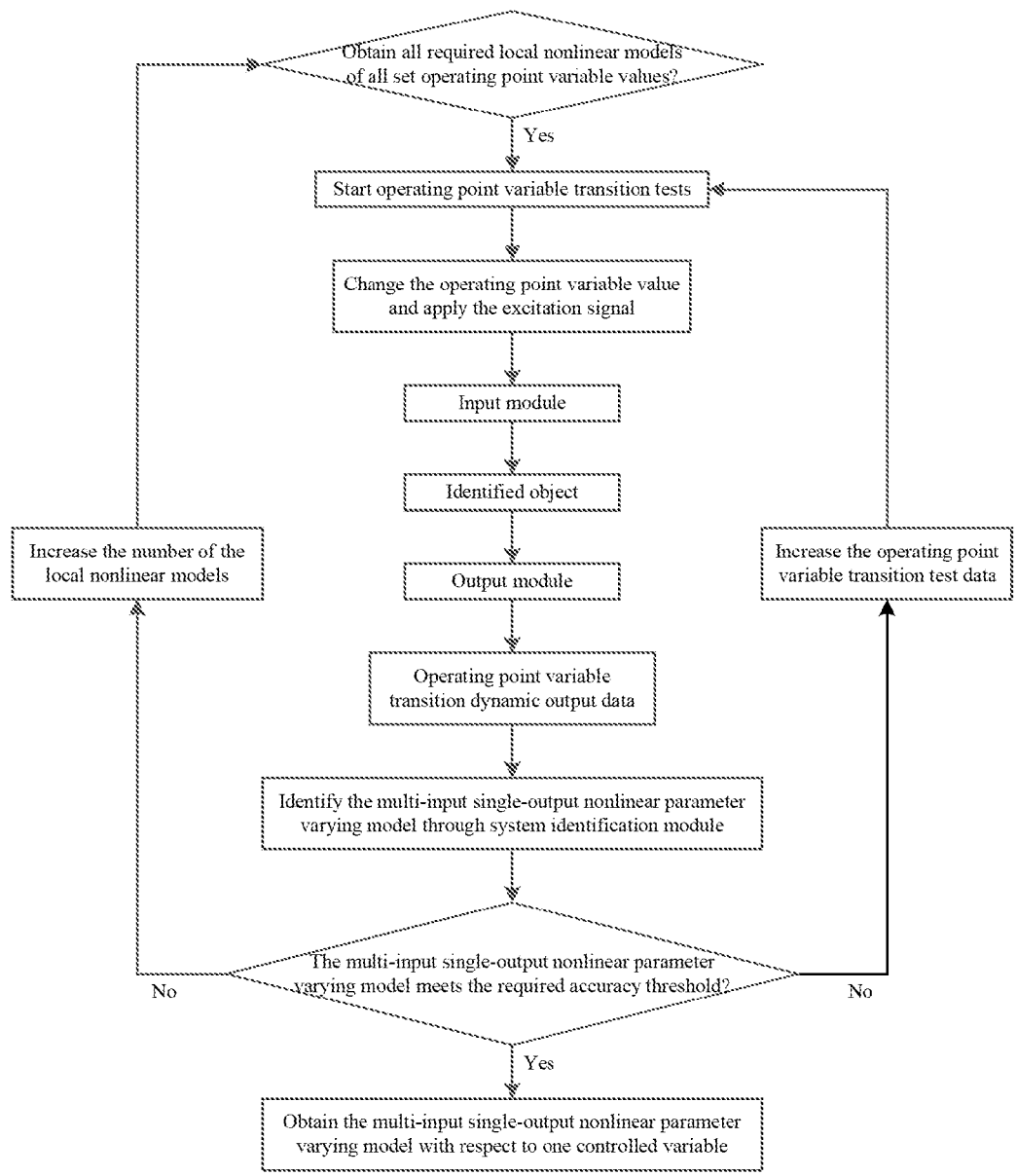
FIG. 3 shows the flow diagram of operating point variable transition tests.

Then check whether the local nonlinear models can meet the required accuracy threshold; if it is not satisfied, adjust the values of the manipulating variables in their working intervals and/or adjust the excitation signal, then return to step (1); otherwise, continue;

Step (4), operating point variable transition tests: FIG. 3 shows the flow diagram of operating point variable transition tests. Said operating point variable transition tests are to transit the identified object from one operating point variable value to another operating point variable value by using the input module; in the operating point variable transition tests, change the operating point variable value, and apply the excitation signal to all the manipulating variables (MV) of the identified object by using the input module, and then obtain the operating point variable transition dynamic output data with respect to said controlled variable (CV) from the output module;

Step (5), identify the multi-input single-output nonlinear parameter varying model: all required local nonlinear models are utilized to convert the local nonlinear models to the multi-input single-output nonlinear parameter varying model (NPV) by using the interpolation philosophy, the weighting functions used in the interpolation philosophy are determined by the parameter estimation method based on the total testing data which include the local nonlinear model test data and the operating point variable transition test data; said local nonlinear model test data include the dynamic input data of the manipulating variables (MV) and the dynamic output data with respect to the controlled variable (CV) occurring in the local nonlinear model tests; said operating point variable transition test data include the dynamic input data of the operating point variable values as well as the manipulating variables (MV) and the dynamic output data with respect to said controlled variable (CV) occurring in the operating point variable transition tests. All required local nonlinear models with respect to all required operating point variable values are utilized to construct the multi-input single-output nonlinear parameter varying model (NPV) using the interpolation philosophy, the steps are following:

1) firstly, the normalized direct linear feedback neural networks (DLF) of local nonlinear models with respect to all required operating point variable values are weighted by triangular weighting functions; in this embodiment, use triangular weight compensation (weight value is proportional to the distance between the current operating point and three given different operating point with variable values of $\delta_1$, $\delta_2$, $\delta_3$), the compensation method is simple, but it is much better than the average weight, and the compensation method can achieve some compensation for nonlinear changes in most industrial objects. Specific operation is as follows:

$$f_i[\delta(t), u_i(t)] \approx \hat{f}_i^\delta[u_i(t)] = \varphi_1(\delta)\hat{f}_i^1[u_i(t)] + \varphi_2(\delta)\hat{f}_i^2[u_i(t)] + \varphi_3(\delta)\hat{f}_i^3[u_i(t)] \quad (i=1,\ldots m) \quad (4)$$

the triangular weighting functions are defined as $$\phi_1(\delta) = \begin{cases} 1 & \delta < \delta_1 \\ \dfrac{\delta_2 - \delta}{\delta_2 - \delta_1} & \delta_1 \le \delta \le \delta_2 \\ 0 & \delta > \delta_2 \end{cases} \quad (5a)$$

$$\phi_2(\delta) = \begin{cases} 0 & \delta < \delta_2 \\ \dfrac{\delta - \delta_1}{\delta_2 - \delta_1} & \delta_1 \le \delta \le \delta_2 \\ \dfrac{\delta_3 - \delta}{\delta_3 - \delta_2} & \delta_2 < \delta \le \delta_3 \\ 0 & \delta > \delta_3 \end{cases} \quad (5b)$$

$$\phi_3(\delta) = \begin{cases} 0 & \delta < \delta_2 \\ \dfrac{\delta - \delta_2}{\delta_3 - \delta_2} & \delta_2 \le \delta \le \delta_3 \\ 1 & \delta > \delta_3 \end{cases} \quad (5c)$$

2) then, based on the obtained local nonlinear models of all required operating point variable values, curve mapping between input data and output data of all local nonlinear model tests and all operating point variable transition tests is carried out by using weighting functions, wherein the weighting function parameters are estimated by using the least square method.

The multi-input single-output nonlinear parameter varying model described by equations (1) and (2) can be approximated by an operating-trajectory model as $$Y(t) = \eta_1(\delta)\{\hat{G}_1^1(q) \times \hat{f}_1^\delta[u_1(t)] + \ldots + \hat{G}_m^1(q) \times \hat{f}_m^\delta[u_m(t)]\}$$

$$+ \eta_2(\delta)\{\hat{G}_1^2(q) \times \hat{f}_1^\delta[u_1(t)] + \ldots + \hat{G}_m^2(q) \times \hat{f}_m^\delta[u_m(t)]\}$$

$$+ \eta_3(\delta)\{\hat{G}_1^3(q) \times \hat{f}_1^\delta[u_1(t)] + \ldots + \hat{G}_m^3(q) \times \hat{f}_m^\delta[u_m(t)]\} + v(t) \quad (6)$$

Here the weighting functions $\eta_1(\delta)$, $\eta_2(\delta)$, and $\eta_3(\delta)$ are functions of the operating point variable $\delta$. The multi-input single-output nonlinear parameter varying model described by equation (6) is obtained by interpolation of the nonlinear hybrid Hammerstein models of all required operating point variable values, wherein $\eta_1(\delta)$, $\eta_2(\delta)$, and $\eta_3(\delta)$ can be called interpolation weighting functions.

Assume that gains and time constants vary as monotonic functions of $\delta$ between each two neighboring set values of the operating point variable, the simplified model in equation (6) can be a good approximation of the multi-input single-output nonlinear parameter varying model in equation (1).

The weighting functions are nonlinear functions of the operating point variables, said weighting functions adopt spline functions, exponential functions or polynomial functions.

Using cubic spline function, for example, each cubic spline weighting function is given as:

$$\eta_1(\delta) = \lambda_1^1 + \lambda_2^1 \delta + \sum_{j=2}^{s-1} \lambda_{j+1}^1 |\delta - p_j|^3 \quad (7)$$

Three weighting functions take the same nodes $\{p_1, p_2, \ldots p_s\}$ and these nodes are distributed evenly or unevenly across the entire operating range $$\delta_{min} = p_1 < p_2 < \ldots < p_s = \delta_{max} \quad (8)$$

The weighting functions used in the interpolation philosophy are determined by the least square method based on the total testing data which include the local nonlinear model test data and the operating point variable transition test data:

$$\hat{Y}_1(t) = \{\hat{G}_1^1(q) \times \hat{f}_1^\delta[u_1(t)] + \ldots + \hat{G}_m^1(q) \times \hat{f}_m^\delta[u_m(t)]\} \quad (9a)$$

$$\hat{Y}_2(t) = \{\hat{G}_1^2(q) \times \hat{f}_1^\delta[u_1(t)] + \ldots + \hat{G}_m^2(q) \times \hat{f}_m^\delta[u_m(t)]\} \quad (9b)$$

$$\hat{Y}_3(t) = \{\hat{G}_1^3(q) \times \hat{f}_1^\delta[u_1(t)] + \ldots + \hat{G}_m^3(q) \times \hat{f}_m^\delta[u_m(t)]\} \quad (9c)$$

and define $e_{OE}(t)$ as the output error of equation (6):

$$e_{OE}(t) = Y(t) - \left[\eta_1(\delta)\hat{Y}_1(t) + \eta_2(\delta)\hat{Y}_2(t) + \eta_3(\delta)\hat{Y}_3(t)\right] \quad (10)$$

$$\hat{\theta} = \min_{\theta} \sum_{t=1}^{N} [e_{OE}(t)]^2 \quad (11)$$

-continued where (12)
$$\hat{\theta} = [\lambda_1^1, \lambda_2^1, \ldots, \lambda_m^1, \lambda_1^2, \lambda_2^2, \ldots, \lambda_m^2, \lambda_1^3, \lambda_2^3, \ldots, \lambda_m^3]^T$$

Specific procedure of parameter estimation is as follows:
$Y(t)=[y(1), y(2), \ldots, y(N)]^T$, N is the number of the total available data.

$$\partial(t) = [1 \quad \delta(t) \quad |\delta(t) - p_2|^3 \quad \ldots \quad |\delta(t) - p_{s-1}|^3] \quad (13)$$

$$\Phi = \begin{bmatrix} \partial(1)\hat{Y}_1(1) & \partial(1)\hat{Y}_2(1) & \partial(1)\hat{Y}_3(1) \\ \partial(2)\hat{Y}_1(2) & \partial(2)\hat{Y}_2(2) & \partial(2)\hat{Y}_3(2) \\ \ldots & \ldots & \ldots \\ \partial(N)\hat{Y}_1(N) & \partial(N)\hat{Y}_2(N) & \partial(N)\hat{Y}_3(N) \end{bmatrix} \quad (14)$$

$$\hat{\theta} = [\Phi^T\Phi]^{-1}\Phi^T Y(t) \quad (15)$$

Only when the data matrix $\Phi$ is full rank, the parameters of the weighting functions have a unique solution. This requires the test data to meet the following conditions:

① In identification tests, operating point variables $\delta(t)$ should have distinct values in the operating range $[\delta_{min}, \delta_{max}]$. The number of distinct values should be three times greater than the order of the cubic spline weighing function;

② The actual process is stable for all distinct operating point variables $\delta(t)$ and the three local nonlinear models identified are also stable;

③ The three local nonlinear models identified have different dynamics, in other words, they have different time constants, zeros or poles.

④ The order of GBN persistent excitation signal in identification tests requires more than twice the highest order of the linear part of local nonlinear hybrid Hammerstein model.

However, if the industrial process variables at different operating points have the same poles and zeros, and only the gain as a function of the operating point variable $\delta$ and varying with $\delta$, the test data do not meet the condition ③, and then the data matrix $\Phi$ is not a full column rank matrix. The problem can be solved by using different nodes in different weighting functions to make $\Phi$ full column rank, and then the data matrix $\Phi$ can be rewritten as $$\Phi = \begin{bmatrix} \partial^1(1)\hat{Y}_1(1) & \partial^2(1)\hat{Y}_2(1) & \partial^3(1)\hat{Y}_3(1) \\ \partial^1(2)\hat{Y}_1(2) & \partial^2(2)\hat{Y}_2(2) & \partial^3(2)\hat{Y}_3(2) \\ \ldots & \ldots & \ldots \\ \partial^1(N)\hat{Y}_1(N) & \partial^2(N)\hat{Y}_2(N) & \partial^3(N)\hat{Y}_3(N) \end{bmatrix} \quad (16)$$

where $$\partial^1(t) = [1 \quad \delta(t) \quad |\delta(t) - p_2^1|^3 \quad \ldots \quad |\delta(t) - p_{s-1}^1|^3] \quad (17a)$$

$$\partial^2(t) = [1 \quad \delta(t) \quad |\delta(t) - p_2^2|^3 \quad \ldots \quad |\delta(t) - p_{s-1}^2|^3] \quad (17b)$$

$$\partial^3(t) = [1 \quad \delta(t) \quad |\delta(t) - p_2^3|^3 \quad \ldots \quad |\delta(t) - p_{s-1}^3|^3] \quad (17c)$$

If the conditions ①, ②, ④ are met, the parameters of the weighting functions also have a unique solution, even if the condition ③ is not met.

Step (6), check whether the multi-input single-output nonlinear parameter varying model (NPV) obtained in Step (5) can meet the required accuracy threshold; if it is not satisfied, increase the number of the local nonlinear models and turn to step (3), or increase the operating point variable transition test data and turn to step (4); if satisfied, continue;

Step (7), repeat the above steps from step (1) to step (6) for identifying all the multi-input single-output nonlinear parameter varying models (NPV) with respect to all the controlled variables (CV), and then complete the identification of the multi-input multi-output nonlinear parameter varying models (NPV) by putting together all the multi-input single-output nonlinear parameter varying models (NPV) with respect to all the controlled variables (CV).

Figure 6:
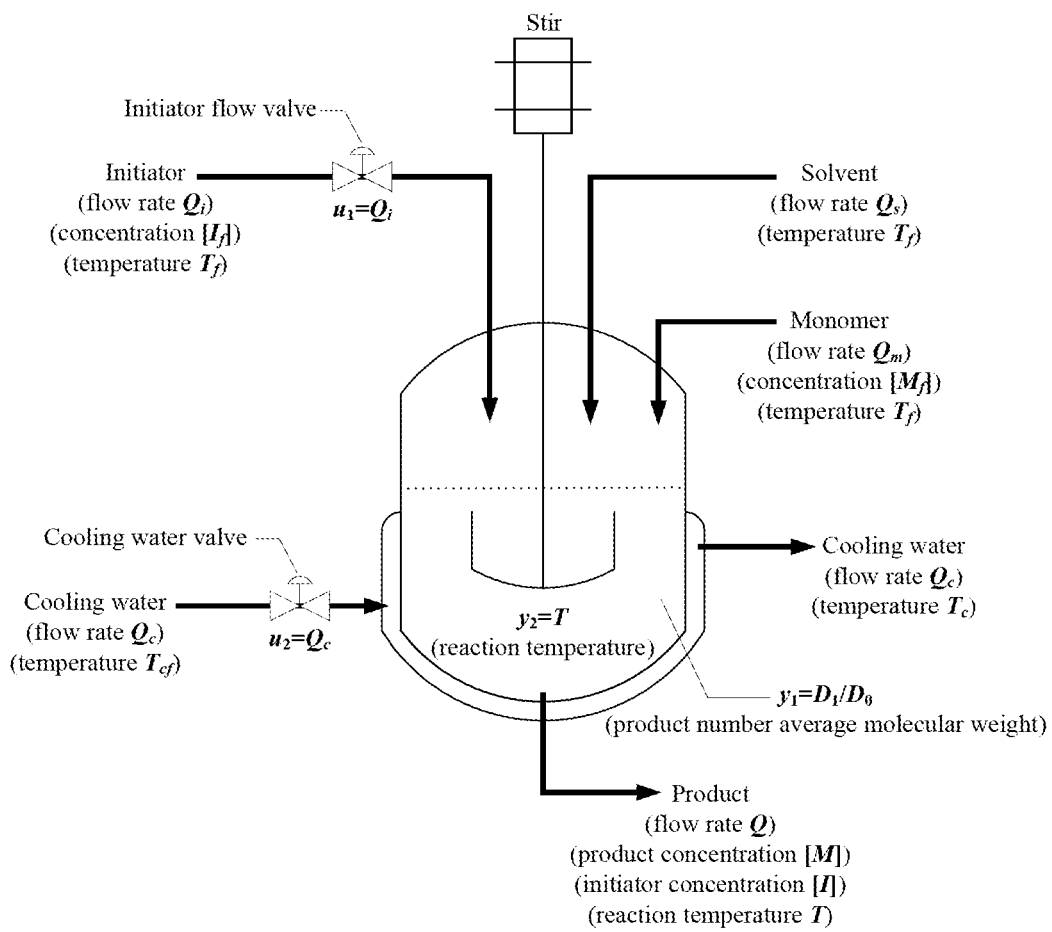
FIG. 6 shows the process flow diagram of the free-radical solution polymerization process of styrene in a jacketed continuous stirred tank reactor (jacketed CSTR).

Give an example below for further explanation of the embodiment of the present invention. FIG. 6 shows the process flow diagram of the free-radical solution polymerization process of styrene in a jacketed continuous stirred tank reactor (jacketed CSTR). The whole process is governed by the following nonlinear differential equations (two-input two-output system):

$$\frac{d[I]}{dt} = \frac{(Q_i[I_f] - Q_t[I])}{V} - k_d[I]$$

$$\frac{d[M]}{dt} = \frac{(Q_m[M_f] - Q_t[m])}{V} - k_d[M][P]$$

$$\frac{d[T]}{dt} = \frac{Q_t(T_f - T)}{V} + \frac{(-\Delta H_r)}{\rho C_p}k_p[M][P] - \frac{hA}{\rho C_p V}(T - T_c)$$

$$\frac{d[T_c]}{dt} = \frac{Q_c(T_{cf} - T_c)}{V_c} + \frac{hA}{\rho_c C_{pc} V_c}(T - T_c)$$

$$\frac{d[D_0]}{dt} = 0.5k_t[P]^2 - \frac{Q_t D_0}{V}$$

$$\frac{d[D_1]}{dt} = M_m k_p[M][P] - \frac{Q_t D_1}{V}$$

$$u_1 = Q_i, u_2 = Q_c, y_1 = \frac{D_1}{D_0}, y_2 = T$$

$$[P] = \left[\frac{2fk_d[I]}{k_t}\right]^{0.5}, Q_t = Q_i + Q_s + Q_m$$

$$k_i = A_i \exp(-E_i/T), i = d, p, t$$

where the specific parameters can refer to the literature: Jaisinghani & Ray (1977), On the dynamic behavior of a class of homogeneous continuous stirred tank polymerization reactors, Chemical Engineering Science, 32(8):811-825, in which: the controlled variables (CV) are the number average molecular weight of product $y_1$ (unit: g/mol) and the reaction temperature $y_2$ (unit: K), the manipulating variables (MV) are the initiator flow rate $u_1$ (unit: L/s) and the cooling water flow rate $u_2$ (unit: L/s). Initiator flow rate $u_1$ is chosen as the operating point variable. The operating range of $u_1$ is [0.01 0.03]. The working interval of $u_2$ is [0.1 0.3]. Without loss of generality, in this embodiment, for example, three operating point variable values are selected as initiator flow rate $u_1$=0.01, 0.02, 0.03 L/s; FIG. 1 shows the flow diagram of the identification method of nonlinear parameter varying models (NPV), comprising the following steps:

Step (1), local nonlinear model tests: FIG. 2 shows the flow diagram of local nonlinear model tests. On the premise of that the operating point variable $u_1$ remains 0.01 L/s, traverse all the values of cooling water flow rate $u_2$ as the manipulating variable (MV) in its working interval [0.1 0.3] by using the input module, and obtain the steady-state output data with respect to the controlled variable $y_1$ from the output module; finally, the excitation signal is applied to all the manipulating variables (MV) of the identified object by using the input module, and obtain the dynamic output data with respect to the controlled variable $y_1$ from the output module;

Step (2), identify local nonlinear models: the system identification module automatically carries out the local nonlinear model identification based on the steady output data and dynamic output data obtained in step (1) by using the nonlinear identification method to estimate the parameters of the local nonlinear models, and then obtains the local nonlinear models at the set value of the operating point variable in step (1); on the premise of that the operating point variable $u_1$ remains 0.01 L/s, local nonlinear models can be identified by using the nonlinear hybrid Hammerstein model structure, said structure can refer to FIG. 4 and FIG. 5. Specific function expression is as follows:

$$X_{i,j}^{0.01}(t)=W_{i,j}^{0.01}U_i(t)+N_{BPi,j}^{0.01}(U_i(t)) i=1,2; j=1,2; \quad (18)$$

$$Y_1(t)=G_{1,1}^{0.01}(q)X_{1,1}^{0.01}(t)+G_{1,2}^{0.01}(q)X_{1,2}^{0.01}(t) \quad (19a)$$

$$Y_2(t)=G_{2,1}^{0.01}(q)X_{2,1}^{0.01}(t)+G_{2,2}^{0.01}(q)X_{2,2}^{0.01}(t) \quad (19b)$$

where U(t) is the steady-state input data, W is constant coefficient matrix, X(t) is intermediate variable, $G_{i,j}(q)$ is the transfer function from the intermediate variable X(t) to the controlled variable Y(t), $N_{BPi,j}^{0.01}$ is the multilayer feedforward BP neural networks mapping.

As mentioned above, after training the static normalized direct linear feedback neural networks (DLF) and identifying the linear part of the model, the nonlinear hybrid Hammerstein models can be obtained.

Step (3), repeat the above step (1) and step (2) for automatically completing the identification of all required local nonlinear models of all set operating point variable values, and obtain all required local nonlinear models of all set operating point variable values; said all set operating point variable values include the upper bound 0.03 L/s and the lower bound 0.01 L/s of the operating range of the operating point variable;

Three multi-input single-output local nonlinear models, obtained by the above identification method based on nonlinear hybrid Hammerstein model, can be written as when $\delta(t)=0.01$ L/s:

$$X_{i,j}^{0.01}(t)=W_{i,j}^{0.01}U_i(t)+N_{BPi,j}^{0.01}(U_i(t)) i=1,2; j=1,2; \quad (20)$$

$$Y_1(t)=G_{1,1}^{0.01}(q)X_{1,1}^{0.01}(t)+G_{1,2}^{0.01}(q)X_{1,2}^{0.01}(t) \quad (21a)$$

$$Y_2(t)=G_{2,1}^{0.01}(q)X_{2,1}^{0.01}(t)+G_{2,2}^{0.01}(q)X_{2,2}^{0.01}(t) \quad (21b)$$

when $\delta(t)=0.02$ L/s:

$$X_{i,j}^{0.02}(t)=W_{i,j}^{0.02}U_i(t)+N_{BPi,j}^{0.02}(U_i(t)) i=1,2; j=1,2; \quad (22)$$

$$Y_1(t)=G_{1,1}^{0.02}(q)X_{1,1}^{0.02}(t)+G_{1,2}^{0.02}(q)X_{1,2}^{0.02}(t) \quad (23a)$$

$$Y_2(t)=G_{2,1}^{0.02}(q)X_{2,1}^{0.02}(t)+G_{2,2}^{0.02}(q)X_{2,2}^{0.02}(t) \quad (23b)$$

when $\delta(t)=0.03$ L/s:

$$X_{i,j}^{0.03}(t)=W_{i,j}^{0.03}U_i(t)+N_{BPi,j}^{0.03}(U_i(t)) i=1,2; j=1,2; \quad (24)$$

$$Y_1(t)=G_{1,1}^{0.03}(q)X_{1,1}^{0.03}(t)+G_{1,2}^{0.03}(q)X_{1,2}^{0.03}(t) \quad (25a)$$

$$Y_2(t)=G_{2,1}^{0.03}(q)X_{2,1}^{0.03}(t)+G_{2,2}^{0.03}(q)X_{2,2}^{0.03}(t) \quad (25b)$$

Then check whether the local nonlinear models can meet the required accuracy threshold; if it is not satisfied, adjust the values of the manipulating variables in their working intervals and/or adjust the excitation signal, then return to step (1); otherwise, continue;

Step (4), operating point variable transition tests: FIG. 3 shows the flow diagram of operating point variable transition tests. The process of the operating point variable $u_1$ changing from 0.01 L/s to 0.02 L/s or from 0.02 L/s to 0.03 L/s is referred to transition. Dynamic input data $\{U(t)\}$ and dynamic output data $\{Y(t)\}$ are obtained by applying the excitation signal to the manipulating variables of the identified object through the input module, said excitation signal adopts superposed signal comprising the generalized binary noise test signal (GBN) and the small-amplitude white noise.

Step (5), identify the multi-input single-output nonlinear parameter varying model: all required local nonlinear models are utilized to convert the local nonlinear models to the multi-input single-output nonlinear parameter varying model (NPV) by using the interpolation philosophy, the weighting functions used in the interpolation philosophy are determined by the parameter estimation method based on the total testing data which include the local nonlinear model test data and the operating point variable transition test data; said local nonlinear model test data include the dynamic input data of the variable $u_2$ and the dynamic output data with respect to $y_1$ occurring in the local nonlinear model tests; said operating point variable transition test data include the dynamic input data of the operating point variable $u_1$ as well as the manipulating variable $u_2$ and the dynamic output data with respect to $y_1$ occurring in the operating point variable transition tests. All required local nonlinear models of all set operating point variable values are utilized to construct the multi-input single-output nonlinear parameter varying model (NPV) by using the interpolation philosophy, the steps are following:

1) the normalized direct linear feedback neural networks (DLF) are weighted to take the nonlinear trend compensation into account; in this embodiment, adopt triangular weight compensation (weight value is proportional to the distance between the current operating point and three given different local operating points with variable values of $\delta_1$, $\delta_2$, $\delta_3$):

$$X_{1,i}^{\delta}(t)=\varphi_1(\delta)[W_{1,i}^{0.01}U_j^*(t)+N_{BP1,i}^{0.01}(U_j^*(t))]$$

$$+\varphi_2(\delta)[W_{1,i}^{0.02}U_j^*(t)+N_{BP1,i}^{0.02}(U_j^*(t))]$$

$$+\varphi_3(\delta)[W_{1,i}^{0.03}U_j^*(t)+N_{BP1,i}^{0.03}(U_j^*(t))] (i=1,2) \quad (26)$$

where $\delta$ represents the value of the operating point variable $u_1$, and the triangular weights are defined as follows:

$$\phi_1(\delta) = \begin{cases} 1 & \delta < 0.01 \\ \dfrac{0.02-\delta}{0.02-0.01} & 0.01 \le \delta \le 0.02 \\ 0 & \delta > 0.02 \end{cases} \quad (27a)$$

$$\phi_2(\delta) = \begin{cases} 0 & \delta < 0.01 \\ \dfrac{\delta-0.01}{0.02-0.01} & 0.01 \le \delta \le 0.02 \\ \dfrac{0.03-\delta}{0.03-0.02} & 0.02 < \delta \le 0.03 \\ 0 & \delta > 0.03 \end{cases} \quad (27b)$$

$$\phi_3(\delta) = \begin{cases} 0 & \delta < 0.02 \\ \dfrac{\delta-0.02}{0.03-0.02} & 0.02 \le \delta \le 0.03 \\ 1 & \delta > 0.03 \end{cases} \quad (27c)$$

2) the multi-input single-output nonlinear parameter varying model can be obtained by adopting the model interpolation structure; said model interpolation structure can approximately describe the system parameter varying situation, and the specific structure is as follows:

$$\hat{Y}_1^1(t) = G_{1,1}^{0.01}(q)\hat{X}_{1,1}^\delta(t) + G_{1,2}^{0.01}(q)\hat{X}_{1,2}^\delta(t) \tag{28a}$$

$$\hat{Y}_1^2(t) = G_{1,1}^{0.02}(q)\hat{X}_{1,1}^\delta(t) + G_{1,2}^{0.02}(q)\hat{X}_{1,2}^\delta(t) \tag{28b}$$

$$\hat{Y}_1^3(t) = G_{1,1}^{0.03}(q)\hat{X}_{1,1}^\delta(t) + G_{1,2}^{0.03}(q)\hat{X}_{1,2}^\delta(t) \tag{28c}$$

Assume that gains and time constants vary as monotonic functions of $\delta$ between each two neighboring set values of the operating point variable, then the parameter varying model can be well approximated by the weighted structure:

$$\hat{Y}_1 = \eta_1(\delta)\hat{Y}_1^1(t) + \eta_2(\delta)\hat{Y}_1^2(t) + \eta_3(\delta)\hat{Y}_1^3(t) + v(t) \tag{29}$$

The weighting functions are nonlinear functions of the operating point variables, said weighting functions adopt spline functions, exponential functions or polynomial functions.

Using cubic spline function, for example, each cubic spline weighting function is given as:

$$\eta_1(\delta) = \lambda_1^1 + \lambda_2^1 \delta + \sum_{j=2}^{s-1} \lambda_{j+1}^1 |\delta - p_j|^3 \tag{30}$$

Three weighting functions take the same nodes $\{p_1, p_2, \ldots, p_s\}$ and these nodes may be distributed evenly or unevenly across the entire operating range. Here we evenly select $\{0.01, 0.015, 0.02, 0.025, 0.03\}$ for interpolation.

$$\delta_{min} = p_1 = 0.01 < p_2 < \ldots < p_s = \delta_{max} = 0.03 \tag{31}$$

All test data $\{U^*(t)\}$ and $\{Y^*(t)\}$ including local nonlinear model test data and operating point variable transition test data can be used to train the weighting functions, and the parameters of the weighting functions can be determined by the least square method of the output error:

$$e_{OE}(t) = Y_1^*(t) - \left[\eta_{1,1}(\delta)\hat{Y}_1^1(t) + \eta_{1,2}(\delta)\hat{Y}_1^2(t) + \eta_{1,3}(\delta)\hat{Y}_1^3(t)\right] \tag{32}$$

$$\hat{\theta} = \min_\theta \sum_{t=1}^N [e_{OE}(t)]^2 \tag{33}$$

where (34)

$$\hat{\theta} = [\lambda_1^1, \lambda_2^1, \ldots, \lambda_s^1, \lambda_1^2, \lambda_2^2, \ldots, \lambda_s^2, \lambda_1^3, \lambda_2^3, \ldots, \lambda_s^3]^T$$

Specific procedure of parameter estimation is as follows: $Y_1^*(t) = [y_1(1), y_1(2), \ldots, y_1(N)]^T$, N is the number of the total available data.

$$\partial(t) = [1 \quad \delta(t) \quad |\delta(t) - p_2|^3 \quad \ldots \quad |\delta(t) - p_{s-1}|^3] \tag{35}$$

$$\Phi = \begin{bmatrix} \partial(1)\hat{Y}_1^1(1) & \partial(1)\hat{Y}_1^2(1) & \partial(1)\hat{Y}_1^3(1) \\ \partial(2)\hat{Y}_1^1(2) & \partial(2)\hat{Y}_1^2(2) & \partial(2)\hat{Y}_1^3(2) \\ \ldots & \ldots & \ldots \\ \partial(N)\hat{Y}_1^1(N) & \partial(N)\hat{Y}_1^2(N) & \partial(N)\hat{Y}_1^3(N) \end{bmatrix} \tag{36}$$

$$\hat{\theta} = [\Phi^T \Phi]^{-1} \Phi^T Y_1^*(t) \tag{37}$$

Step (6), check whether the multi-input single-output nonlinear parameter varying model (NPV) with respect to the controlled variable $y_1$ obtained in Step (5) can meet the required accuracy threshold; if it is not satisfied, increase the number of the local nonlinear models and turn to step (3), or increase the operating point variable transition test data and turn to step (4); if satisfied, continue;

Step (7), repeat the above steps from step (1) to step (6) for identifying the multi-input single-output nonlinear parameter varying models (NPV) with respect to the controlled variable $y_2$, and then complete the identification of the multi-input multi-output nonlinear parameter varying models (NPV) by putting together all the multi-input single-output nonlinear parameter varying models (NPV) with respect to all the controlled variables (CV).

Figure 7:
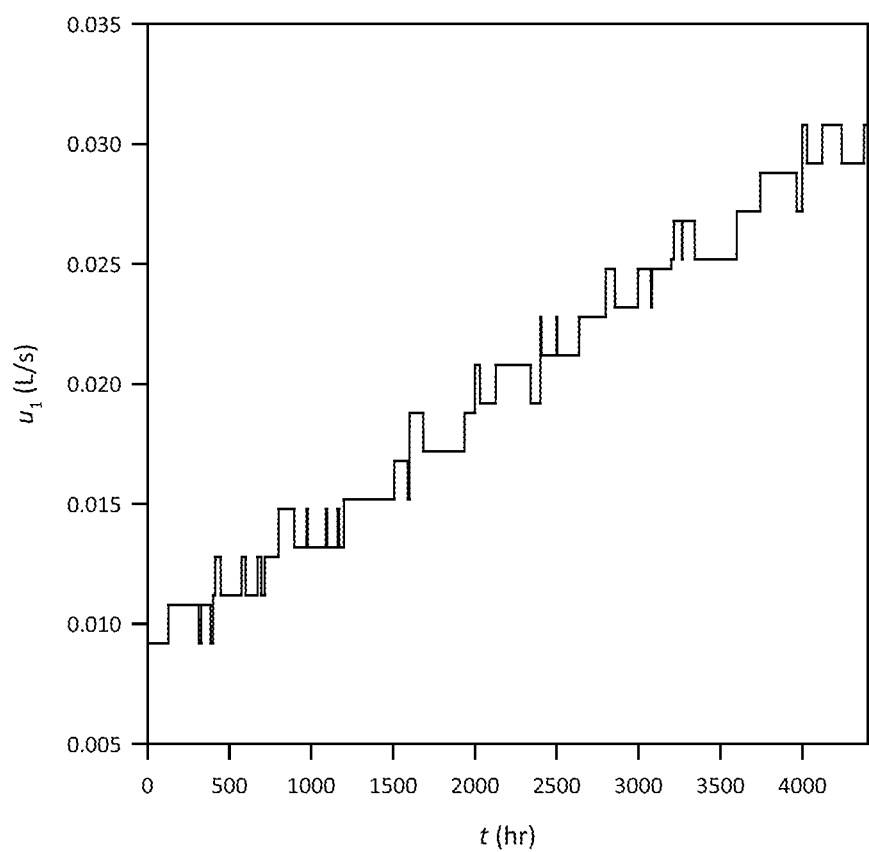
FIG. 7 shows the input signal of $u_1$ which is initiator flow rate and also chosen as the operating point variable.
Figure 8:
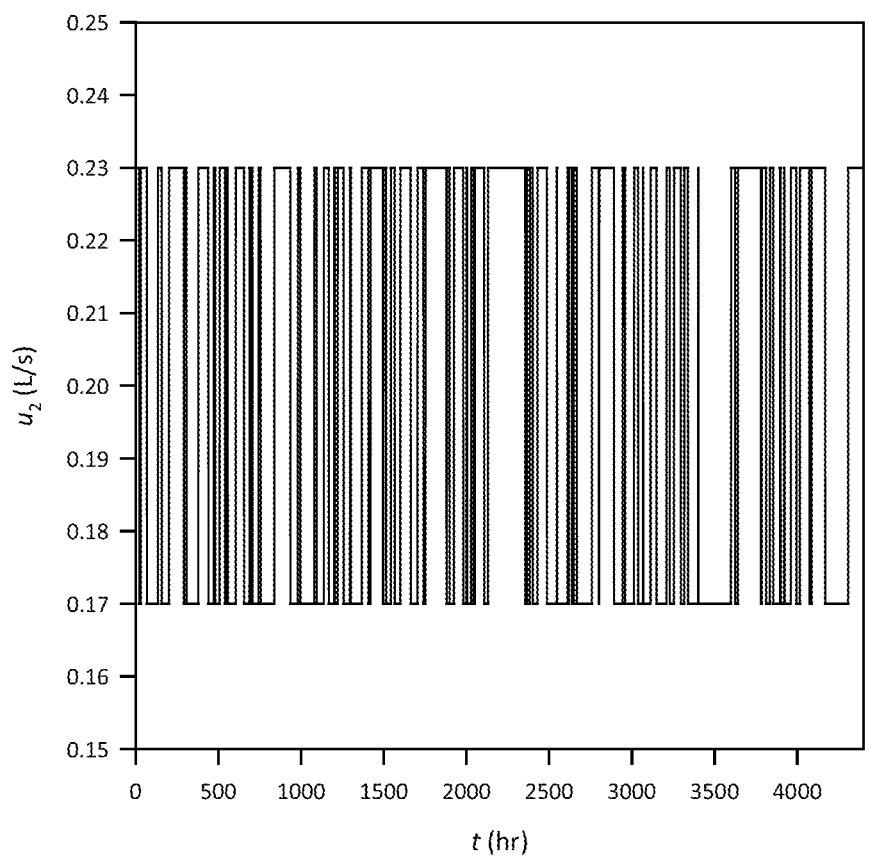
FIG. 8 shows the input signal of $u_2$ which is cooling water flow rate and also a manipulating variable.
Figure 9:
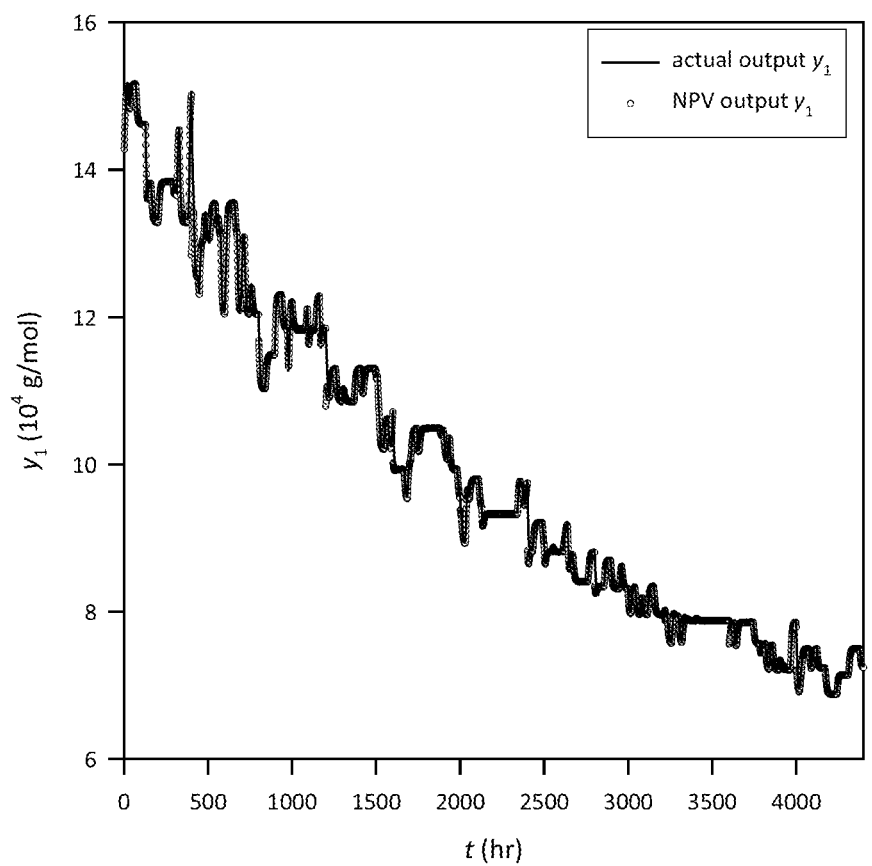
FIG. 9 shows the output response of $y_1$ under the input excitation signal in FIGS. 7 and 8, where $y_1$ is product number average molecular weight and also a controlled variable.
Figure 10:
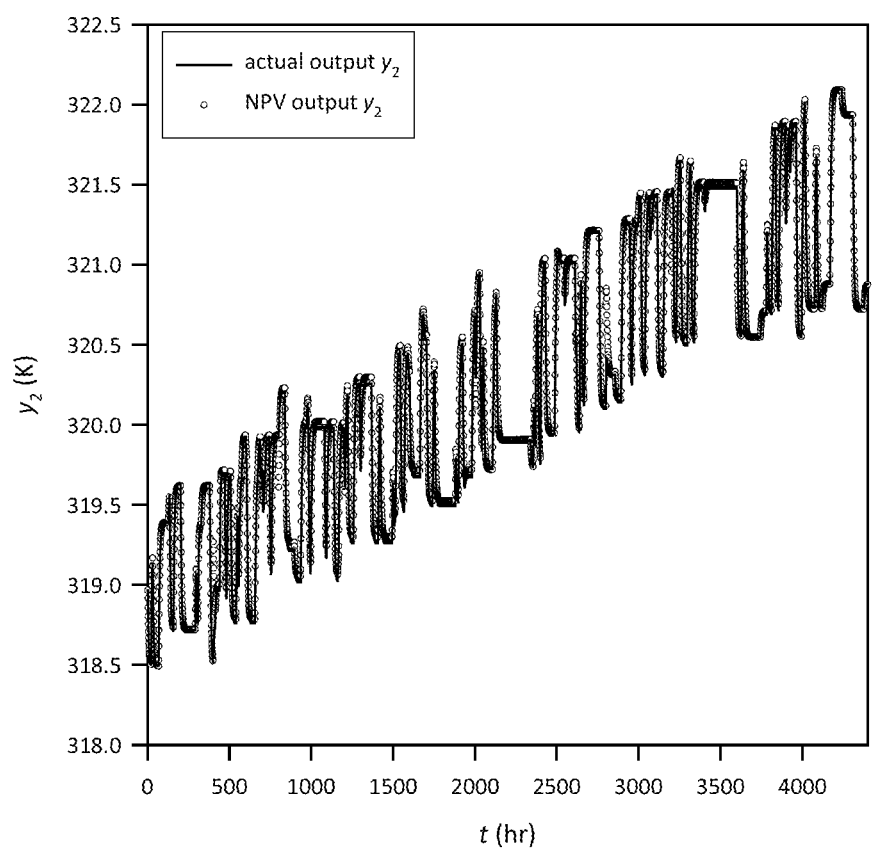
FIG. 10 shows the output response of $y_2$ under the input excitation signal in FIGS. 7 and 8, where $y_2$ is reaction temperature and also a controlled variable.

Results and discussions of the above example are as follows: FIG. 7 shows the input signal of $u_1$ which is initiator flow rate and also chosen as the operating point variable. FIG. 8 shows the input signal of $u_2$ which is cooling water flow rate and also a manipulating variable. FIG. 9 and FIG. 10 show the output response of $y_1$ and $y_2$ under the input excitation signal in FIGS. 7 and 8, where $y_1$ is product number average molecular weight and also a controlled variable, $y_2$ is reaction temperature and also a controlled variable. It can be seen from FIG. 9 and FIG. 10 that nonlinear parameter varying models can well describe the nonlinearity of model parameters varying with the operating point variable.

Figure 11:
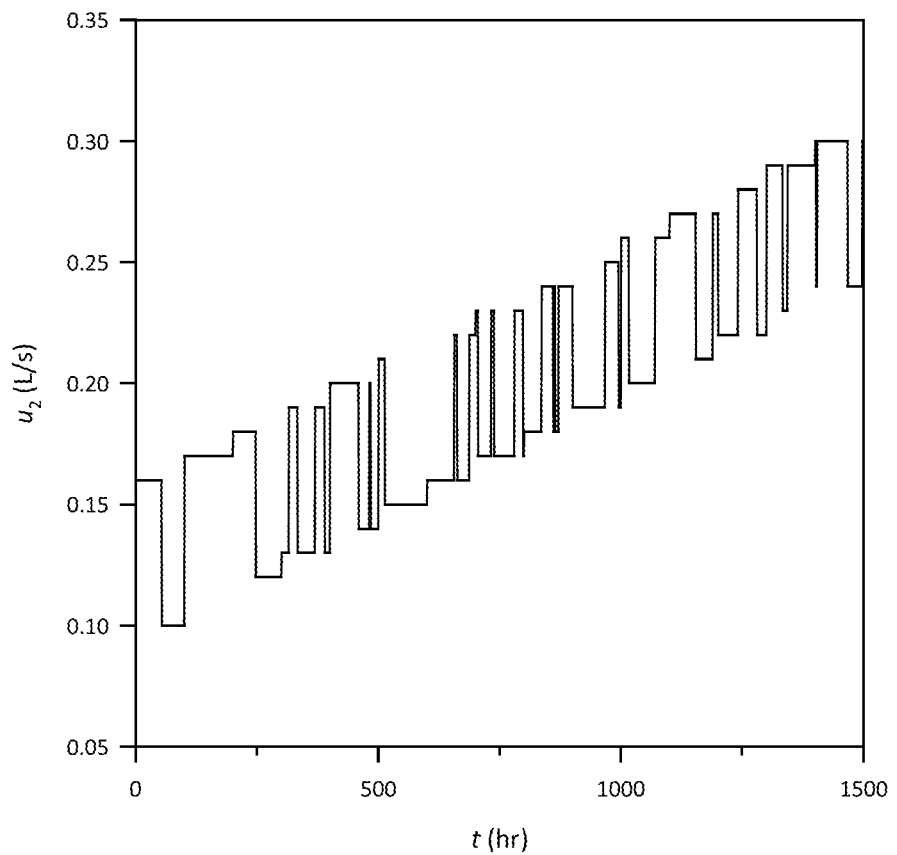
FIG. 11 shows the input signal of $u_2$ which is cooling water flow rate and also a manipulating variable, where initiator flow rate and also the operating point variable $u_1$=0.02 L/s.
Figure 12:
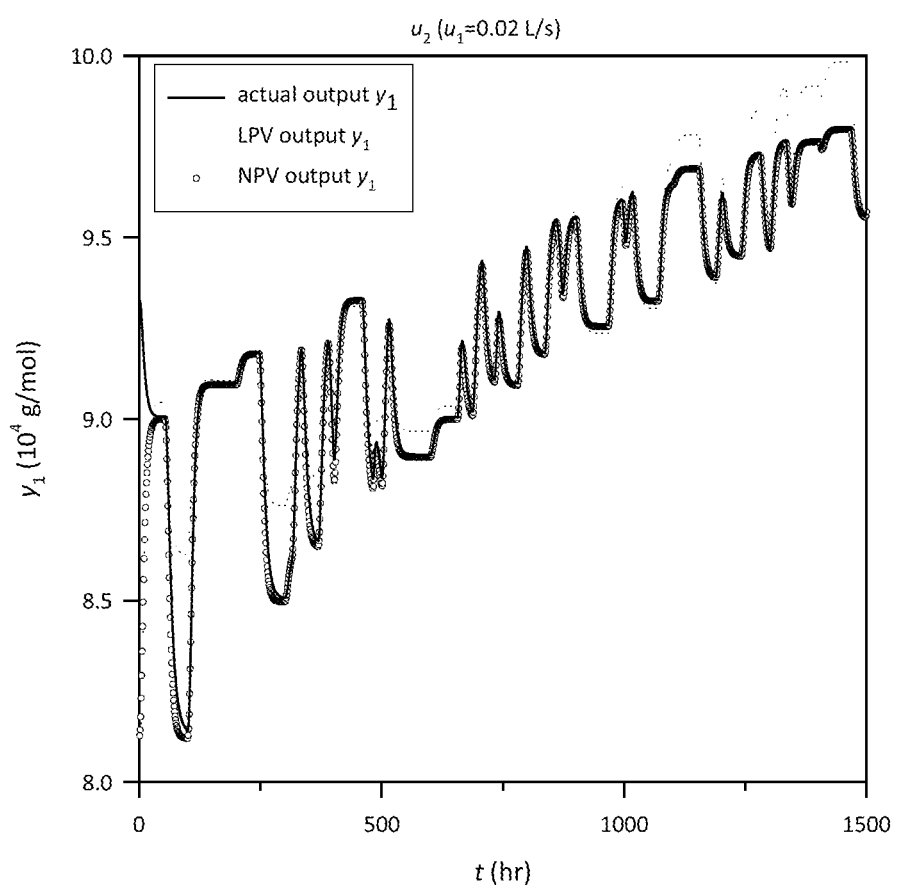
FIG. 12 shows the output response of $y_1$ under the input excitation signal in FIG. 11, where $y_1$ is product number average molecular weight and also a controlled variable.
Figure 13:
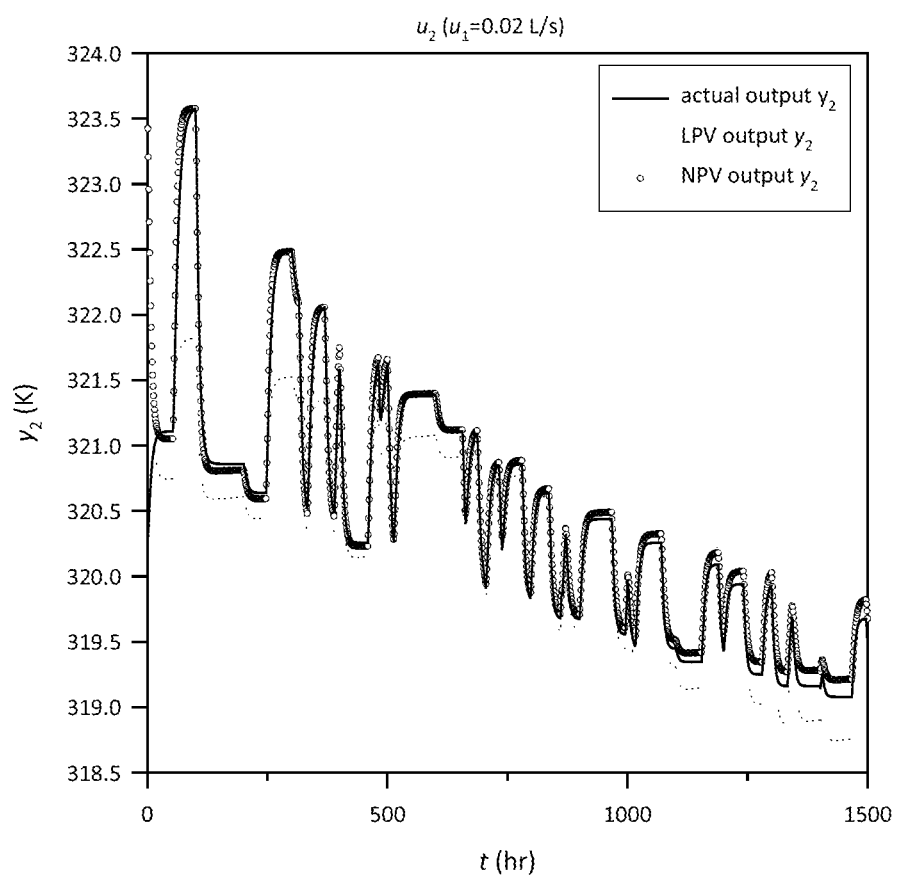
FIG. 13 shows the output response of $y_2$ under the input excitation signal in FIG. 11, where $y_2$ is reaction temperature and also a controlled variable.

FIG. 11 shows the input signal of $u_2$ which is cooling water flow rate and also a manipulating variable, where initiator flow rate and also the operating point variable $u_1 = 0.02$ L/s. FIG. 12 and FIG. 13 show the output response of $y_1$ and $y_2$, respectively, under the input excitation signal in FIG. 11, where $y_1$ is product number average molecular weight and also a controlled variable, $y_2$ is reaction temperature and also a controlled variable. FIG. 12 and FIG. 13 compare the performance of the identification method of nonlinear parameter varying models (NPV) with the identification method of model interpolation linear parameter varying models (LPV). The results show that the NPV method of the present invention can achieve higher model accuracy, and can well solve the nonlinear problem between the system input and the system output at a given operating point, at the same time just need to add a small amount of identification test data and algorithm computation time.

The above-mentioned embodiment indicates that the identification method of nonlinear parameter varying models of the present invention is a model identification method taking into account both the nonlinearity between the system input and the system output at a given operating point and the nonlinearity of parameter varying with operating point variable values, meanwhile the method needs limited data for identification and achieves higher accuracy.

The above-mentioned embodiment is used to explain the present invention, only as the preferred embodiment of the present invention, and is not used to limit the present invention; in the scope of protection of the present invention spirit and claims, any modification, equivalent replacement, improvement, etc., of the present invention, falls into the scope of protection of the present invention.

The invention claimed is:

1. Identification method of nonlinear parameter varying models (NPV), the method based on nonlinear model identification system, said system comprises four parts including input module, identified object, output module, and system identification module, the input module applies the excitation signal to the identified object, the output signal of the identified object is sent to the system identification module by using the output module, the operating conditions of the identified object are described with one or more operating point variables, said method comprises the following steps:

Step (1), local nonlinear model tests: the term "local" refers to that the value of the operating point variable remains constant; firstly, set the value of the operating point variable; on the premise of that the operating point variable remains constant, set the values of the manipulating variables in their working intervals; then, traverse all the values of the manipulating variables (MV) in their working intervals by using the input module, and obtain the steady-state output data with respect to one controlled variable (CV) from the output module; if the number of the manipulating variables (MV) is more than one, when traversing all the values of one manipulating variable in its working interval by using the input module, other manipulating variables remain constant; finally, the excitation signal is applied to all the manipulating variables (MV) of the identified object by using the input module, and obtain the dynamic output data with respect to said controlled variable (CV) from the output module;

Step (2), identify local nonlinear models: the system identification module automatically carries out the local nonlinear model identification based on the steady output data and dynamic output data obtained in step (1) by using the nonlinear identification method to estimate the parameters of the local nonlinear models, and then obtains the local nonlinear models at the set value of the operating point variable in step (1);

Step (3), repeat the above step (1) and step (2) for automatically completing the identification of all required local nonlinear models with respect to all set operating point variable values, and obtain all required local nonlinear models of all set operating point variable values; said all set operating point variable values include the upper bound and the lower bound of the operating range of the operating point variable; and then check whether the local nonlinear models can meet the required accuracy threshold; if it is not satisfied, adjust the values of the manipulating variables in their working intervals and/or adjust the excitation signal, then return to step (1); otherwise, continue;

Step (4), operating point variable transition tests: said operating point variable transition tests are to transit the identified object from one operating point variable value to another operating point variable value by using the input module; in the operating point variable transition tests, change the operating point variable value, and apply the excitation signal to all the manipulating variables (MV) of the identified object by using the input module, and then obtain the operating point variable transition dynamic output data with respect to said controlled variable (CV) from the output module;

Step (5), identify the multi-input single-output nonlinear parameter varying model: all required local nonlinear models are utilized to convert the local nonlinear models to the multi-input single-output nonlinear parameter varying model (NPV) by using the interpolation philosophy, the weighting functions used in the interpolation philosophy are determined by the parameter estimation method based on the total testing data which include the local nonlinear model test data and the operating point variable transition test data;

Step (6), check whether the multi-input single-output nonlinear parameter varying model (NPV) obtained in Step (5) can meet the required accuracy threshold; if it is not satisfied, increase the number of the local nonlinear models and turn to step (3), or increase the operating point variable transition test data and turn to step (4); if satisfied, continue;

Step (7), repeat the above steps from step (1) to step (6) for identifying all the multi-input single-output nonlinear parameter varying models (NPV) with respect to all the controlled variables (CV), and then complete the identification of the multi-input multi-output nonlinear parameter varying models (NPV) by putting together all the multi-input single-output nonlinear parameter varying models (NPV) with respect to all the controlled variables (CV).

2. Identification method of nonlinear parameter varying models (NPV) as claimed in claim 1 wherein the nonlinear identification method in said step (2) is the identification method based on non-parametric model, or the system identification method based on Hammerstein or Wiener structural model.

3. Identification method of nonlinear parameter varying models (NPV) as claimed in claim 2 wherein the system identification method based on Hammerstein or Wiener structural model in said step (2) is the system identification method based on Hammerstein or Wiener structural parametric model, or is the system identification method based on Hammerstein or Wiener structural non-parametric/parametric hybrid model, the Hammerstein or Wiener structural model is consisting of the normalized static nonlinear part of the model and the linear part of the model.

4. Identification method of nonlinear parameter varying models (NPV) as claimed in claim 3 wherein the system identification method based on Hammerstein structural non-parametric/parametric hybrid model in said step (2) adopts the nonlinear hybrid Hammerstein model structure, said structure is consisting of the static normalized direct linear feedback neural networks (DLF) part and the linear part of the model.

5. Identification method of nonlinear parameter varying models (NPV) as claimed in claim 4 wherein the system identification method based on nonlinear hybrid Hammerstein model structure in said step (2) comprises the following steps:

1) train the static normalized direct linear feedback neural networks (DLF): (a) normalize the steady-state output data with respect to said controlled variable (CV) at the set value of the operating point variable; (b) fit the linear algebraic equations $X(t)=WU(t)$ by using the normalized steady-state output data and the steady-state input data, where $U(t)$ is the steady-state input data, W is constant coefficient matrix, $X(t)$ is intermediate variable; (c) calculate the error $E(t)$ between the normalized steady-state output data of the identified object and $WU(t)$; (d) train the multilayer feedforward BP neural networks mapping by using the error $E(t)$ and the steady-state input data $U(t)$;

2) identify the linear part of the model: (a) convert all dynamic input data $\{U(t)\}$ to intermediate variable data $\{X(t)\}$ by using the static DLF neural networks obtained; (b) the parameters used in the linear part of the model are determined by the linear identification method, using intermediate variable data $\{X(t)\}$ and dynamic output data $\{Y(t)\}$ as input data and output data for the linear part of the model, respectively.

6. Identification method of nonlinear parameter varying models (NPV) as claimed in claim 5 wherein said step (5) comprises the following steps:
1) firstly, the normalized direct linear feedback neural networks (DLF) of local nonlinear models with respect to all required operating point variable values are weighted by triangular weighting functions;
2) then, based on the obtained local nonlinear models of all required operating point variable values, curve mapping between input data and output data from all local nonlinear model tests and operating point variable transition tests is carried out by using weighting functions, wherein the weighting function parameters are estimated by using the least square method.

7. Identification method of nonlinear parameter varying models (NPV) as claimed in claim 6 wherein the normalized direct linear feedback neural networks (DLF) of local nonlinear models of all required operating point variable values are weighted by triangular weighting functions, said triangular weighting functions are predetermined instead of parameter identification.

8. Identification method of nonlinear parameter varying models (NPV) as claimed in claim 1 wherein the weighting functions used in the interpolation philosophy in said step (5) are nonlinear functions of operating point variable, said weighting functions adopt spline functions, exponential functions or polynomial functions.

9. Identification method of nonlinear parameter varying models (NPV) as claimed in claim 1 wherein the parameter estimation method of the weighting functions in said step (5) adopts the least square method or the maximum likelihood estimation method.

* * * * *